US009234093B2

(12) United States Patent
Ellul et al.

(10) Patent No.: US 9,234,093 B2
(45) Date of Patent: Jan. 12, 2016

(54) THERMOPLASTIC VULCANIZATES

(75) Inventors: Maria Dolores Ellul, Silver Lake Village, OH (US); Periagaram S. Ravishankar, Kingwood, TX (US); Paul E. McDaniel, Cuyahoga Falls, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 218 days.

(21) Appl. No.: 12/933,847

(22) PCT Filed: Mar. 31, 2008

(86) PCT No.: PCT/US2008/058889
§ 371 (c)(1),
(2), (4) Date: Jan. 11, 2011

(87) PCT Pub. No.: WO2009/123609
PCT Pub. Date: Oct. 8, 2009

(65) Prior Publication Data
US 2011/0112238 A1    May 12, 2011

(51) Int. Cl.
C08J 3/24 (2006.01)
C08L 23/10 (2006.01)
C08L 23/16 (2006.01)
C08K 3/16 (2006.01)
C08K 3/22 (2006.01)
C08K 3/34 (2006.01)
C08K 5/00 (2006.01)
C08K 5/01 (2006.01)

(52) U.S. Cl.
CPC .............. *C08L 23/10* (2013.01); *C08L 23/16* (2013.01); *C08K 3/16* (2013.01); *C08K 3/22* (2013.01); *C08K 3/346* (2013.01); *C08K 5/0025* (2013.01); *C08K 5/01* (2013.01); *C08L 2205/02* (2013.01)

(58) Field of Classification Search
CPC ..... C08L 23/10; C08L 23/16; C08L 2205/02; C08L 2666/06; C08K 3/16; C08K 3/22; C08K 3/346; C08K 5/0025; C08K 5/01
USPC .................. 524/543, 502, 518; 525/191, 237; 523/220
See application file for complete search history.

(56) References Cited

U.S. PATENT DOCUMENTS

| | | |
|---|---|---|
| 2,972,600 A | 2/1961 | Braidwood |
| 3,287,440 A | 11/1966 | Giller |
| 4,087,485 A | 5/1978 | Huff |
| 4,311,628 A | 1/1982 | Abdou-Sabet et al. |
| 4,454,092 A * | 6/1984 | Shimizu et al. .............. 264/349 |
| 4,540,753 A | 9/1985 | Cozewith et al. |
| 4,594,390 A | 6/1986 | Abdou-Sabet et al. |
| 5,290,866 A | 3/1994 | Dobreski et al. |
| 5,397,832 A | 3/1995 | Ellul |
| 5,656,693 A | 8/1997 | Ellul et al. |
| 5,936,028 A | 8/1999 | Medsker et al. |
| 5,952,425 A | 9/1999 | Medsker et al. |
| 6,042,260 A | 3/2000 | Heidemeyer et al. |
| 6,147,160 A | 11/2000 | Wang et al. |
| 6,211,312 B1 | 4/2001 | Holtcamp |
| 6,437,030 B1 | 8/2002 | Coran et al. |
| 6,451,915 B1 | 9/2002 | Ellul et al. |
| 6,747,099 B1 | 6/2004 | Novits et al. |
| 6,867,260 B2 | 3/2005 | Datta et al. |
| 7,622,528 B2 * | 11/2009 | Chung et al. .................. 525/191 |
| 2003/0066725 A1 | 4/2003 | Chen |
| 2003/0162926 A1* | 8/2003 | Wouters et al. .............. 526/335 |
| 2004/0009327 A1 | 1/2004 | Saarvali et al. |
| 2004/0171758 A1 | 9/2004 | Ellul et al. |
| 2004/0195550 A1 | 10/2004 | Debaud et al. |
| 2006/0178478 A1 | 8/2006 | Ellul |
| 2007/0021564 A1 | 1/2007 | Ellul et al. |
| 2007/0083008 A1 | 4/2007 | Ellul et al. |
| 2008/0033089 A1 | 2/2008 | Ellul et al. |
| 2008/0033107 A1 | 2/2008 | Wouters et al. |

FOREIGN PATENT DOCUMENTS

| | | |
|---|---|---|
| EP | 0277004 | 8/1988 |
| EP | 0416815 | 3/1991 |
| EP | 0418044 | 3/1991 |
| EP | 0420436 | 4/1991 |
| EP | 0552945 | 7/1993 |
| WO | WO 97/03992 | 2/1997 |

(Continued)

OTHER PUBLICATIONS

U.S. Appl. No. 60/834,694, filed Aug. 1, 2006, Wouters et al.
Rooney, J. G. et al., "*On Line Determination by Light Scattering of Mechanical Degradation in the GPC Process*," Liquid Chromatography of Polymers and Related Materials III, J. Cazes ed., Marcel Dekker (1981), pp. 207-235.
Bovey, F. A., "*Polymer Conformation and Configuration*," Academic Press, New York, 1969.
Flory, Paul J., "*Principles of Polymer Chemistry*," Cornell University Press (1953), p. 310.

(Continued)

Primary Examiner — Susannah Chung
Assistant Examiner — Josephine Chang
(74) Attorney, Agent, or Firm — Jennifer A. Schmidt; Stephen A. Baehl

(57) ABSTRACT

A process for preparing a thermoplastic vulcanizate, the process comprising: charging a reactor with an olefinic copolymer rubber, where the olefinic copolymer rubber is characterized by a multimodal molecular weight, an average branching index of greater than 0.8, includes less than 10 parts by weight oil per 100 parts by weight rubber, includes less than 1 parts by weight non-rubber particulate, per 100 parts by weight rubber, and is in the form of granules having a particle size less than 8 mm; charging the reactor, contemporaneously or sequentially with respect to the rubber, with a thermoplastic resin, an oil, and a cure system; melt mixing the rubber, the thermoplastic resin, the oil, and the cure system; and dynamically vulcanizing the rubber.

10 Claims, No Drawings

(56) References Cited

FOREIGN PATENT DOCUMENTS

| WO | WO 99/41294 | 8/1999 |
|---|---|---|
| WO | WO 99/45040 | 9/1999 |
| WO | WO 99/45041 | 9/1999 |
| WO | WO 99/45047 | 9/1999 |
| WO | WO 00/24792 | 5/2000 |
| WO | WO 00/24793 | 5/2000 |
| WO | WO 00/26296 | 5/2000 |
| WO | WO 01/05849 | 1/2001 |
| WO | WO 01/42249 | 6/2001 |
| WO | WO 02/28946 | 4/2002 |
| WO | WO 02/077089 | 10/2002 |
| WO | WO 03/066725 | 8/2003 |
| WO | WO 2005/092966 | 10/2005 |

OTHER PUBLICATIONS

Ver Strate et al., "*Near Monodisperse Ethylene-Propylene Copolymers by Direct Ziegler-Natta Polymerization. Preparation, Characterization, Properties,*" vol. 21, Macromolecules (1988), pp. 3360-3371.

Ver Strate, G., "*Ethylene-Propylene Elastomers,*" Encyclopedia of Polymer Science and Engineering, 6, 2nd Edition (1986), pp. 522-564.

\* cited by examiner

US 9,234,093 B2

THERMOPLASTIC VULCANIZATES

FIELD OF THE INVENTION

One or more embodiments of the present invention are directed toward thermoplastic vulcanizates prepared with bimodal olefinic elastomeric copolymers.

BACKGROUND OF THE INVENTION

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics.

Thermoplastic vulcanizates may advantageously be prepared by dynamically vulcanizing a rubber with a curative agent while the rubber is being mixed with a thermoplastic resin. Factors that may influence the physical properties of a thermoplastic vulcanizate include those related to the physical properties of the rubber discontinuous phase such as the state of cure, the physical properties of the thermoplastic continuous phase, the size and the concentration of the particles of the discontinuous phase, the presence of fillers, curatives, and other additives present in the composition, and the like.

Physical properties of thermoplastic vulcanizates are often trade-offs between extremes. A need exists in the art for thermoplastic vulcanizate compositions having balanced properties. Ethylene based elastomers such as ethylene-propylene (alpha-olefin)-diene (EPDM) elastomers are generally polymers of very high molecular weight (as measured by their Mooney viscosity), and are often suitable for use in TPV applications. But, high molecular weight EPDM elastomers inherently possess very high viscosities, e.g., Mooney viscosity greater than 200 ML(1+4@125° C.). This inherent characteristic of EPDM results in difficulties related to the processability of these polymers. Extender oil is often added to the polymers to reduce the apparent viscosity.

The required level of extender oil depends on the molecular weight of the elastomer, but is usually sufficient to reduce the apparent viscosity of the oil extended EPDM to a Mooney viscosity of about 100 ML(1+4@125° C.) or below. Commercially available very high molecular weight EPDMs, which would be useful in TPVs, typically contain from about 50 to about 125 phr extender oil.

For example, EPDM as disclosed in WO 2000/26296 is directed to a metallocene based ethylene-alpha-olefin elastomeric composition made by a series reactor operation in which the high molecular weight component has a Mooney viscosity not exceeding 120, and is present in an amount no greater than 50 weight percent. Solvent utilized in this process is removed from metallocene based processes utilizing flash evaporation of the solvent, wherein reduced pressure is applied to the reaction product. However, at least a portion of the oil (if present) in the reaction product may become entrained in the solvent being removed under reduced pressure, and may be removed along with the solvent.

Metallocene based processes may thus be limited to a polymer product having an overall Mooney viscosity of less than about 90 ML (1+4@120° C.) in the absence of extender oil, due to the handling characteristics of such polymers including the difficulties of further processing polymers having a Mooney viscosity above about 90 ML (1+4@120° C.). However, polymer compositions having a Mooney viscosity of less than or equal to about 90 ML (1+4@120° C.) in the absence of extender oil have inferior properties.

WO 2003/066725A2 is directed to bimodal EPDM polymer compositions comprising a major polymer fraction having a Mooney viscosity above 120 ML(1+4@125° C.), and a minor polymer fraction having a Mooney viscosity of 120 ML(1+4@125° C.) or less, where the composition has a tan delta of 0.5 or less (125° C./10.4 rad/s). These compositions are essentially free of extender oil and preferably have an overall Mooney viscosity below 100 ML(1+4@125° C.) to ensure ease of processability. The compositions are prepared using metallocene catalysts in a series reactor process wherein the high molecular weight component is produced in the first reactor, and the low molecular weight component is produced in the second reactor, both using metallocene catalysts. Both components have relatively narrow molecular weight distributions with a polydispersity index ($M_w/M_n$) of less than 4, preferably less than 3. In addition, both components have relatively low branching as indicated by a relatively high average branching index of greater than 0.7, preferably greater than 0.8, on a scale from zero to one in which a branching index of 1 represents a linear polymer.

SUMMARY OF THE INVENTION

In one or more embodiments, the present invention provides a process for preparing a thermoplastic vulcanizate, the process comprising (i) charging a reactor with an olefinic copolymer rubber, where the olefinic copolymer rubber is characterized by a multimodal molecular weight distribution, an average branching index of greater than 0.8, includes less than 10 parts by weight oil per 100 parts by weight rubber, includes less than 1 parts by weight non-rubber particulate, per 100 parts by weight rubber, and is in the form of granules having a particle size less than 8 mm, (ii) charging the reactor, contemporaneously or sequentially with respect to the rubber, with a thermoplastic resin, an oil, and a cure system, (iii) melt mixing the rubber, the thermoplastic resin, the oil, and the cure system, and (iv) dynamically vulcanizing the rubber.

In one or more embodiments, the present invention provides a process for preparing a thermoplastic vulcanizate, the process comprising (i) charging a reactor with an olefinic copolymer rubber, where the olefinic copolymer rubber is synthesized by employing a single-site catalyst and is characterized by a multimodal molecular weight distribution, (ii) charging the reactor, contemporaneously or sequentially with respect to the rubber, with a thermoplastic resin, an oil, and a cure system, (iii) melt mixing the rubber, the thermoplastic resin, the oil, and the cure system, and (iv) dynamically vulcanizing the rubber.

In one or more embodiments, the present invention provides a thermoplastic vulcanizate comprising a cured rubber and a continuous thermoplastic phase, where the cured rubber is the dynamic vulcanization product of a multimodal olefinic copolymer characterized by a multimodal molecular weight distribution, and an average branching index of greater than 0.8.

DETAILED DESCRIPTION OF ILLUSTRATIVE EMBODIMENTS INTRODUCTION

The thermoplastic vulcanizates of one or more embodiments of the present invention are prepared from multimodal olefinic elastomeric copolymers that have been synthesized by employing a single-site transition metal catalyst. The uniqueness of these multimodal olefinic elastomeric copolymers, which may be referred to as multimodal rubbers, provides several technological advantages associated with the thermoplastic vulcanizates. For example, the multimodal rubber can be charged to a reaction vessel in a non-oil extended granular form, which provides processing advantages. And, these advantages are achieved without a deleterious impact on the engineering properties of the thermoplastic vulcanizate. In fact, certain mechanical properties can be improved.

In one or more embodiments, the thermoplastic vulcanizates of the present invention can be prepared by melt-mixing a metallocene-synthesized multimodal rubber with a thermoplastic resin and curing the multimodal rubber while it undergoes melt-mixing with a thermoplastic resin. The dynamic vulcanization may take place in the presence of oil charged to the reactor, as well as other ingredients that have been employed in the art. The resulting thermoplastic vulcanizates include a continuous thermoplastic phase with cured rubber dispersed therein.

Multimodal Rubber

In one or more embodiments, the multimodal olefinic elastomeric copolymer may be characterized by a multimodal molecular weight distribution, which may be simply referred to as multimodal molecular weight. In one or more embodiments, the multimodal olefinic elastomeric copolymer, which may be referred to as multimodal rubber, includes at least two fractions. The multimodality may manifest itself as two distinct peaks or a main peak and a shoulder peak in the $M_{W\ GPC\ LALLS}$ signal. This multimodality may be caused by the blending of a very high with a very low molecular weight component either as a result of sequential polymerization or by physical blending techniques. These multimodal olefinic elastomeric copolymers include those described in U.S. Publ. No. 2003/0162926.

In one or more embodiments, the multimodal rubber is bimodal and includes a first fraction and a second fraction. In one or more embodiments, the first fraction has a Mooney viscosity (MST (5+4@200° C.)) of at least 120, in other embodiments at least 175, and in other embodiments at least 200. In one or more embodiments, the maximum Mooney viscosity may be determined by the desired polydispersity of the blend and the amount of each fraction in the blend.

In one or more embodiments, the second fraction has a Mooney viscosity (ML(1+4@125° C.)) of less than 120, in other embodiments less than 75, and in other embodiments less than 50. In these or other embodiments, the second fraction has a Mooney viscosity (ML(1+4@125° C.)) of greater than 10, in other embodiments greater than 11, in other embodiments greater than 12, in other embodiments greater than 13, in other embodiments greater than 14, and in other embodiments greater than 15. In one or more embodiments, the second fraction may be characterized by a number average molecular weight ($M_n$) of at least 5,000 g/mole, in other embodiments at least 25,000 g/mole, and in other embodiments a viscosity average molecular weight ($M_v$) of at least 9,000 g/mole.

In one or more embodiments, both fractions in the bimodal blend, by themselves, may be characterized by a molecular weight distribution (MWD) of 4 or less, in other embodiments 3 or less, in other embodiments 2.5 or less, and in other embodiments 2 or less. It should be understood, however, that the MWD of the resulting blend can be generally larger (e.g. greater than 3).

As used herein, Mooney viscosity is reported using the format: Rotor ([pre-heat time, min.]+[shearing time, min.]@measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4@125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4@125° C.) value equivalent. The MST rotor used herein was prepared and utilized according to the following specifications:

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor is positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \qquad (1)$$

wherein all logarithms are to the base 10; ML is the Mooney viscosity of a blend of two polymers A and B each having individual Mooney viscosities $ML_A$ and $ML_B$, respectively; $n_A$ represents the wt % fraction of polymer A in the blend; and $n_B$ represents the wt % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125°\text{ C.}) = 5.13 * MST_A(5+4@200°\text{ C.}) \qquad (2)$$

In these or other embodiments, the Mooney viscosity of high molecular weight polymers can be determined by employing a Mooney viscometer model VR/1132 (Ueshima Seisakusho), which can measure Mooney viscosities up to 400 units.

As used herein, MWD, also referred to as polydispersity, represents the weight average molecular weight divided by the number average molecular weight ($M_w/M_n$) of the polymer. In the instant disclosure, $M_w$ and $M_n$ are determined using Gel Permeation Chromatography on a Waters 150 gel permeation chromatograph equipped with a differential refractive index (DRI) detector and a Chromatix KMX-6 using an on-line light scattering photometer. The determination is made at 135° C. using 1,2,4-trichlorobenzene as the mobile phase and one of a Shodex (Showa Denko America, Inc) polystyrene gel column numbered 802, 803, 804 or 805. This technique is discussed in detail in LIQUID CHROMATOGRAPHY OF POLYMERS AND RELATED MATERIALS III, 207 (J. Cazes ed., Marcel Dekker, 1981), which is incorporated herein by reference. For more information, see U.S. Pat. No. 4,540,753 to Cozewith et al. and references cited therein, and in Verstrate et al., 21 *Macromolecules* 3360 (1998). In the data disclosed herein, corrections for column spreading are not employed.

$M_w/M_n$ is preferably calculated from elution times. These numerical analyses are performed using commercially available Beckman/CIS customized LALLS software in conjunction with the standard Gel Permeation package. Calculations involved in the characterization of polymers by $^{13}$C NMR follow the work of F. A. Bovey in "Polymer Conformation and Configuration," Academic Press, New York, 1969. Reference to $M_w/M_n$ implies that the $M_w$ is the value reported using the LALLS detector and $M_n$ is the value reported using the DRI detector.

In one or more embodiments, where a bimodal rubber is employed, the overall polymer may comprise at least 50 wt %, in other embodiments at least 60 wt %, in other embodiments at least 65 wt %, and in other embodiments at least 70 wt % of the first fraction (i.e. the high Mooney viscosity fraction) based on the total polymer weight of the first and second fractions. In these or other embodiments, the bimodal rubber may comprise from about 5 to about 50 wt %, in other embodiments from about 5 to about 40 wt %, in other embodiments from about 5 to about 35 wt %, and in other embodiments from about 5 to about 30 wt % of the second fraction based upon the total weight of the first and second fractions.

In one or more embodiments, the polymer compositions of this invention may have an overall Mooney viscosity (ML(1+4@125° C.)) of at least 30, in other embodiments at least 50, in other embodiments at least 60, in other embodiments at least 100, and in other embodiments at least 150.

In one or more embodiments, the multimodal rubber employed in preparing the thermoplastic vulcanizates of this invention may be characterized generally as linear polymers. In other words, each fraction individually, or in other embodiments the multimodal blend as a whole, may be characterized by a relatively high branching index, which suggests molecules that are generally linear. In one or more embodiments, the multimodal rubber (or the polymers forming the multimodal blend) may be characterized by a branching index (BI) of at least 0.7, in other embodiments at least 0.8, in other embodiments at least 0.85, in other embodiments at least 0.9, in other embodiments at least 0.92, in other embodiments at least 0.95, and in other embodiments at least 1.0.

The relative degree of branching in the instant polymers is determined using an average branching index factor (BI). This factor is calculated using a series of four laboratory measurements of polymer properties in solution, as disclosed in VerStrate, Gary, "Ethylene-Propylene Elastomers," Encyclopedia of Polymer Science and Engineering, 6, 2nd edition (1986), which is incorporated by reference herein. The four measurements are:

(i) weight average molecular weight ($M_w$) measured using a low angle laser light scattering detector (LALLS) in combination with Gel Permeation Chromatography (GPC), abbreviated herein as "$M_{w\ GPC\ LALLS}$";

(ii) weight average molecular weight ($M_w$) determined using a differential refractive index (DRI) detector in combination with GPC, and abbreviated herein as "$M_{w\ GPC\ DR}$";

(iii) viscosity average molecular weight ($M_v$) determined using a differential refractive index (DRI) detector in combination with GPC, and abbreviated herein as "$M_{v\ GPC\ DRI}$"; and (iv) intrinsic viscosity (also referred to in the art as inherent viscosity, and abbreviated IV) measured in decalin at 135° C. The first three measurements (i, ii, and iii) are obtained via GPC using a filtered dilute solution of the polymer in trichlorobenzene.

The average branching index factor (BI), which may be simply referred to as average branching index, as disclosed herein is defined by Equation (3) as:

$$BI = \frac{M_{v,br} \times M_{w,GPC\ DRI}}{M_{w,GPS\ LALLS} \times M_{v,GPC\ DRI}} \qquad (3)$$

where, $M_{v,br} = (IV/k)^{1/a}$; wherein "k" is a measured constant from a linear polymer as described by Paul J. Flory in PRINCIPLES OF POLYMER CHEMISTRY 310 (1953), and the summation is over all the slices in the distribution, and wherein "a" is the Mark-Houwink constant (=0.759 for ethylene, propylene diene elastomeric polymers in decalin at 135° C.).

From equation (3) it follows that the average branching index factor for a linear polymer is 1.0. For branched polymers, the extent of branching is defined relative to a linear polymer. At a constant number average molecular weight $M_n$, $(M_w)_{branch} > (M_w)_{linear}$, BI for branched polymers is less than 1.0 and a smaller BI value denotes a higher level of branching. In instances wherein measuring IV in decalin is impossible, IV may be measured for comparison to the instant disclosure using a viscosity detector in tandem with DRI and LALLS detectors in a so-called GPC-3D instrument. In this case, "k" and "a" values are selected which are appropriate for the GPC solvent used in making the determination.

In one or more embodiments, the multimodal olefinic elastomeric copolymer includes ethylene-alpha-olefin-non-conjugated diene rubbers. These rubbers include rubbery copolymers polymerized from ethylene, at least one α-olefin, and at least one diene monomer. These rubbers may be referred to as EPDM.

The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the maximum amount of ethylene derived units is 90 mole % (corresponding to 85 wt % in EPDM), in other embodiments 80 mole %, in other embodiments 75 mole %, in other embodiments 70 mole %, in other embodiments 65 mole %, and in other embodiments 60 mole % based on the total moles of monomer. In one or more embodiments, the minimum amount of ethylene derived units is 15 mole %, in other embodiments, 20 mole %, in other embodiments 25 mole %, in other embodiments 30 mole %, in other embodiments 35 mole %, in other embodiments 40 mole %, in other embodiments 50 mole %, and in other embodiments 55 mole % based on the total moles of monomer. In one or more embodiments, the diene content maximum is 5.0 mole % (15 wt %), in other embodiments 3.0 mole %, in other embodiments 2.5 mole %, in other embodiments 0.2 mole % (0.7 wt %), in other embodiments 0.3 mole %, and in other embodiments 0.5 mole %. In one or more embodiments, the balance of the polymer units is made up of α-olefin.

Ethylene content may be determined by FTIR, ASTM D3900, and is not corrected for diene content. ENB content may be determined by FTIR, ASTM D6047. Other dienes can be measured via $^1$H NMR. All ranges disclosed herein are inclusive unless otherwise noted.

In one or more embodiments, the first fraction comprises less than 78 wt %, in other embodiments less than 72 wt %, and in other embodiments less than 65 wt % of ethylene derived units based on the total weight of ethylene and α-olefin.

In one or more embodiments, the first and second fractions have a diene content of less than 15 wt %, in other embodiments less than 12 wt %, in other embodiments less than 10 wt %, in other embodiments less than 8 wt %, in other embodiments less than 5 wt %, and in other embodiments less than 3 wt % based on the total weight of ethylene, α-olefin, and diene.

In one or more embodiments, the weight percent (based on total polymer weight) of ethylene in the first fraction and the weight percent of ethylene in the second fraction differ by no more than 20%, in other embodiments no more than 10%. The relative amount of each fraction can vary and will depend on the desired overall polymer polydispersity and resiliency. In other embodiments, both fractions contain the same or similar weight percent of diene, the weight percent in each fraction differing by no more than 8 wt %, in other embodiments no more than 3 wt %, in other embodiments no more than 2 wt %, and in other embodiments no more than 1 wt %.

In one or more embodiments, the fractions can be obtained using series reactors as described below or by using parallel reactors or by mechanical blending though the former method is preferred.

When produced by direct polymerization, the catalyst used is preferably a single-site catalyst, generally with an activity and longevity sufficient to polymerize in a homogeneous environment at temperatures of at least 100° C. so that the different molecular weight fractions can be produced in successive reactors arranged in series by temperature and/or hydrogen control.

In one or more embodiments, the catalyst is a bulky ligand transition metal catalyst. The bulky ligand may contain a multiplicity of bonded atoms, preferably carbon atoms, forming a group, which may be cyclic with one or more optional hetero-atoms. The bulky ligand may be a cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group IV, V or VI transition metal of the Periodic Table of Elements. The transition metal atom is preferably a Group IVB atom. While it is assumed that the transition metal in the active catalyst state is in the 4+ oxidation state and a positively charged cation, precursor transition metal complexes that are generally neutral may be in a lower oxidation state. Reference is made to U.S. Pat. No. 6,211,312 for a more detailed description of suitable metallocene complexes.

The catalyst is derivable from a compound represented by the formula:

$$[L]_m M[X]_n$$

wherein L is the bulky ligand; X is the leaving group, M is the transition metal and m and n are such that the total ligand valency corresponds to the transition metal valency. Preferably the catalyst is four coordinate such that the compound is ionizable to a 1+ valency state. The ligands L and X may be bridged to each other, and if two ligands L and/or X are present, they may be bridged. The metallocenes may be full-sandwich compounds having two ligands L which are cyclopentadienyl groups or half-sandwich compounds having one ligand L only which is a cyclopentadienyl group.

Metallocenes include those compounds that contain one or more cyclopentadienyl moieties in combination with a transition metal of the Periodic Table of Elements. The metallocene catalyst component is represented by the general formula (Cp)mMRnR'p wherein Cp is a substituted or unsubstituted cyclopentadienyl ring; M is a Group IV, V or VI transition metal; R and R' are independently selected halogen, hydrocarbyl group, or hydrocarboxyl groups having 1-20 carbon atoms; m=l-3, n=O-3, p=O-3, and the sum of m+n+p equals the oxidation state of M.

In one or more embodiments, useful metallocenes include biscyclopentadienyl derivatives of a Group IV transition metal, preferably zirconium or hafnium. See WO 1999/41294. These may be derivatives containing a fluorenyl ligand and a cyclopentadienyl ligand connected by a single carbon and silicon atom. (See WO 1999/45040; and WO 1999/45041). In certain embodiments, the Cp ring is unsubstituted and/or the bridge contains alkyl substituents such as alkylsilyl substituents to assist in the alkane solubility of the metallocene. See WO 2000/24792 and WO 2000/24793 (fully incorporated herein by reference). Other metallocene catalyst systems may show a polymerization capability suitable for making the composition according to the invention. For example, EP 418044 uses a monocyclopentadienyl compound similar to that of EP 416815. Similar compounds are described in EP 420436. WO 1997/03992 shows a catalyst in which a single Cp species and a phenol are linked by a C or Si linkage, such as $Me2C(Cp)(3-tBu-5-Me-2-phenoxy)TiCl_2$. WO 2001/05849 discloses Cp-phosphinimine catalysts, such as $(Cp)((tBu)3P=N—)TiCl_2$.

The catalyst may be used with a cocatalyst or activator which, it is assumed according to prevailing theory, helps form the metallocene cation. Aluminum alkyl derived activators may be used of which methyl alumoxane is the prime and well know example. This material may also function as a scavenger and is commercially obtainable from Albemarle or Schering.

Non or weakly coordinating anion (NCA) generating activators of the type described in EP 277004 are preferred. These activators are often used and described in conjunction with the metallocene in the above metallocene patent references. NCA's may be generated from precursors which may be a neutral salt containing the stabilizing anion or a nonionic Lewis Base capable of abstracting a group from the transition metal complex to form a stabilizing anion. The NCA may, depending on mode of generation, have three or four ligands substituted on a metal atom such as boron or aluminum. The ligands are preferably fluorinated, more preferably perfluorinated, aromatic moieties such as phenyl bisphenyl or naphthyl. Reference is also made to WO 2001/42249 which describes another suitable NCA structure (fully incorporated herein by reference).

In operation on a commercial scale, the high catalyst activity and low catalyst concentration lead to increased sensitivity to poisons. Poisons may enter into the polymerization reactor as impurities in the solvent or monomer feed or be generated by secondary processes such as the catalyst killing operation, generally performed with water after polymerization proper is completed.

These poisons may be deactivated by using an alkyl aluminum scavenger such as triethylaluminum, (TEAL), titanium boron aluminum (TIBAL) or n-octyl aluminum. The presence of poison can also be countered by providing a molecular sieve or other purifying installation as part of the recycle in the continuous reactor lay out.

Conditions as between the first and the second reactor may be differentiated as described in WO 1999/45047. Generally a terpolymer (containing a suitable diene) is made using ethylene, higher alpha-olefin (e.g. propylene, butylene, hexene, and octene) and non-conjugated diene in a process which comprises: a) feeding a first set of monomers containing a diene to a first reactor, b) adding a single site catalyst to the first reactor, c) operating the first reactor to polymerize the first set of monomers to produce an effluent containing a first polymer component and optionally unreacted monomers, d) feeding the effluent of c) to a second reactor, e) feeding a second set of monomers to the second reactor, f) operating the second reactor to polymerize the second set of monomers and any unreacted monomers to produce a second polymer component. Optionally, additional catalyst may also be fed to the second reactor. The final polymer product comprises the mixture of said first and second polymer components.

After polymerization and any catalyst deactivation or killing, the solvent can be removed by one or more flashing steps or a liquid phase separation as described in EP 552945 so that the solvent content is lowered to 0.1 wt % or less. The solvent can be recycled and the polymer baled or pelletized.

In one or more embodiments, the multimodal rubber can be introduced with the other ingredients used to make thermoplastic vulcanizates (e.g. within a reactor) in a non-oil extended granular form. In one or more embodiments, the granular multimodal rubber includes less than 10 parts by weight, in other embodiments less than 5 parts by weight, in other embodiments less than 2 parts by weight, and in other embodiments less than 1 part by weight oil per 100 parts by weight rubber. In one or more embodiments, the granular multimodal rubber is substantially devoid, and in other embodiments devoid of an extender oil.

In one or more embodiments, the granular multimodal rubber may be characterized by a weight-average particle size of less than 8 mm, in other embodiments less than 6 mm, and in other embodiments less than 4 mm. In these or other embodiments, the granular multimodal rubber may be characterized by a weight-average particle size of at least 0.5 mm, in other embodiments at least 1.0 mm, in other embodiments at least 1.5 mm, and in other embodiments at least 2.0 mm.

In one or more embodiments, the multimodal rubber can be introduced with the other ingredients used to make the thermoplastic vulcanizates (e.g. within a reactor) in a granular form with little or no non-rubber particulate. In one or more embodiments, the amount of non-rubber particulate, such as carbon black, within or carried by the multimodal rubber as it is introduced with the other ingredients used to make the thermoplastic vulcanizate is less than 15 parts by weight, in other embodiments less than 5.0 parts by weight, in other embodiments less than 1.0 part by weight, in other embodiments less than 0.5 part by weight, and in other embodiments less than 0.05 part by weight per 100 parts by weight rubber. In these or other embodiments, the rubber is devoid, and in other embodiments substantially devoid, of non-rubber particulate. In one or more embodiments, the non-rubber particulate includes carbon black and/or inorganic materials.

Thermoplastic Polymer

The thermoplastic polymer, which may also be referred to as a thermoplastic resin, may include those thermoplastic polymers that have been employed in the manufacture of thermoplastic vulcanizates as taught in the art. For example, these thermoplastic polymers, which may be referred to as thermoplastic resins or unfunctionalized thermoplastics, may include solid, generally high molecular weight plastic resins. Exemplary thermoplastic polymers include crystalline, semicrystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, See U.S. Pat. No. 6,867,260 B2. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at lease 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by a Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg@230° C.) of less than 100 dg/min, in other embodiments less than 50 dg/min, in other embodiments less than 10 dg/min, and in other embodiments less than 5 dg/min. In these or other embodiments, the propylene-based polymers can have a MFR of at least 0.1 dg/min, in other embodiments 0.2 dg/min and in other embodiments at least 0.5 dg/min.

In one or more embodiments, useful propylene-based polymers can have a melt temperature ($T_m$) that is from about 110° C. to about 170° C., in other embodiments from about 140° C. to about 168° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg@230° C.) that is less than or equal to 10 dg/min, in other embodiments less than or equal to 1.0 dg/min, and in other embodiments less than or equal to 0.5 dg/min.

Oils/Extenders

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly (isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil). Oils described in U.S. Pat. No. 5,936, 028 may also be employed. It is believed that synthetic oils may provide enhanced low temperature performance. Also, high temperature performance may be enhanced based upon molecular structure.

In one or more embodiments, the extender oils may include organic esters, alkyl ethers, or combinations thereof including those disclosed in U.S. Pat. Nos. 5,290,866 and 5,397, 832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

Polymeric Processing Additives

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, in other embodiments, greater than about 750 dg/min, in other embodiments, greater than about 1000 dg/min, in other embodiments, greater than about 1200 dg/min, and in other embodiments, greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915.

Other Constituents

In addition to the rubber, thermoplastic resins, and optional processing additives, the thermoplastic vulcanizates of the invention may optionally include one or more processing oils (aromatic, paraffinic and napthathenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, dessicants, stabilizers, light stabilizer, light absorber, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Amounts

In one or more embodiments, the thermoplastic vulcanizates of this invention may contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 wt %, in other embodiments at least about 45 wt %, in other embodiments at least about 65 wt %, and in other embodiments at least about 75 wt % of rubber (i.e., dynamically-vulcanized rubber) based upon the total weight of the thermoplastic vulcanizates. In these or other embodiments, the amount of rubber within the thermoplastic vulcanizates can be from about 15 to about 90 wt %, in other embodiments from about 45 to about 85 wt %, and in other embodiments from about 60 to about 80 wt %, based on the entire weight of the rubber and thermoplastic combined.

In one or more embodiments, the amount of thermoplastic polymer (i.e., uncured polymer within the thermoplastic phase) within the thermoplastic vulcanizates can be from about 10 to about 85 wt %, in other embodiments from about 10 to about 40 wt %, and in other embodiments from about 12 to about 30 wt %, based on the entire weight of the rubber and thermoplastic combined. In these or other embodiments, the amount of thermoplastic polymer within the thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the oil, the thermoplastic vulcanizate may include from about 25 to about 250 parts by weight, or from about 50 to about 150 parts by weight, or from about 75 to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

Curatives

The thermoplastic vulcanizate feedstock prepared according to the present invention may be dynamically vulcanized by employing conventional cure systems. Examples include phenolic resin cure systems, silicon-containing cure systems, and peroxide cure systems (i.e., free-radical cure systems).

Useful phenolic cure systems are disclosed in U.S. Pat. Nos. 2,972,600, 3,287,440, 5,952,425 and 6,437,030. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins are employed. The blend includes from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one embodiment, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

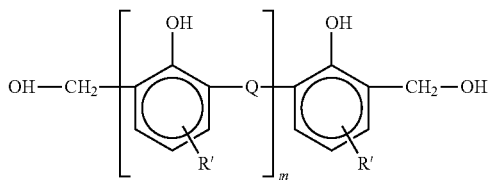

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer. Useful zinc oxide includes that conventionally employed for rubber processing. In one or more embodiments, the zinc oxide can have a mean particle diameter of about 0.05 to about 0.15 µm. Useful zinc oxide can be obtained commercially under the tradename Kadox™ 911 (Horsehead, Corp.). In these or other embodiments, the phenolic resin can be used in conjunction with an acid scavenger, such as a hydrotalcite, which may be added downstream of cure.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purpose of U.S. patent practice. In certain embodiments, cure systems such as those described in U.S. Pat. No. 6,747,099, U.S. Application Publication No. 2004/0195550, and International Patent Application Publication Nos. 2002/28946, 2002/077089, and 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α-β-ethylenically unsaturated metal carboxylates are useful, as disclosed in U.S. patent application Ser. No. 11/180,235. Coagents may also be employed as neat liquids or together with a carrier. For example, the multi-functional acrylates or multi-functional methacrylates together with a carrier are useful, as disclosed in U.S. patent application Ser. No. 11/246,773. Also, the curative and/or coagent may be pre-mixed with the plastic prior to formulation of the thermoplastic vulcanizate, as described in U.S. Pat. No. 4,087,485.

The skilled artisan will be able to readily determine a sufficient or effective amount of curative and/or coagent to be employed without undue calculation or experimentation. Those skilled in the art appreciate that the amount of curative employed may vary based upon the chemical nature of the peroxide and/or coagent employed. In these or other embodiments, the amount of curative employed may vary based upon the type of rubber employed, as well as the cross-linkable units present within the rubber.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

Preparation of TPV

As is known in the art, thermoplastic vulcanizates may be prepared by dynamic vulcanization of the rubber in the presence of a non-vulcanizing thermoplastic polymer. Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628, 4,594,390, 5,656,693, 6,147,160, and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. In particular embodiments, oil is introduced to the mixture. In certain embodiments, the addition of sufficient oil allows for the achievement of particular advantageous properties of the thermoplastic vulcanizate.

Product Characteristics

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

Articles of Manufacture

The thermoplastic elastomers of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

Specific Embodiments

Embodiment A

A process for preparing a thermoplastic vulcanizate, the process comprising: charging a reactor with an olefinic copolymer rubber, where the olefinic copolymer rubber is characterized by a multimodal molecular weight, an average branching index of greater than 0.8, includes less than 10 parts by weight oil per 100 parts by weight rubber, includes less than 1 parts by weight non-rubber particulate, per 100 parts by weight rubber, and is in the form of granules having a particle size less than 8 mm; charging the reactor, contemporaneously or sequentially with respect to the rubber, with a thermoplastic resin, an oil, and a cure system; melt mixing the rubber, the thermoplastic resin, the oil, and the cure system; and dynamically vulcanizing the rubber.

Embodiment B

The method of embodiment A; where said step of charging the reactor, contemporaneously or sequentially with respect to the rubber, with a thermoplastic resin, an oil, and a cure system also includes charging the reactor with filler.

Embodiment C

The method of embodiments A-B; where the olefinic copolymer rubber is characterized by an average branching index of greater than 0.9.

Embodiment D

The method of embodiments A-C; where the olefinic copolymer rubber is characterized by an average branching index of greater than 0.95.

Embodiment E

The method of embodiments A-D; where the olefinic copolymer rubber includes less than 1 part by weight oil per 100 parts by weight rubber.

Embodiment F

The method of embodiments A-E; where the olefinic copolymer rubber is substantially devoid of rubber.

Embodiment G

The method of embodiments A-F; where the olefinic copolymer rubber is devoid of rubber.

Embodiment H

The method of embodiments A-G; where the olefinic copolymer rubber includes less than 0.1 part by weight non-rubber particulate per 100 parts by weight rubber.

Embodiment I

The method of embodiments A-H; where the olefinic copolymer rubber includes less than 0.01 part by weight non-rubber particulate per 100 parts by weight rubber.

Embodiment J

The method of embodiments A-I; where the olefinic copolymer rubber is in the form of granules having a particle size of less than 6 mm.

Embodiment K

The method of embodiments A-J; where the olefinic copolymer rubber is characterized by a bimodal molecular weight and includes a first fraction and a second fraction.

Embodiment L

The method of embodiments A-K; where the first fraction is characterized by a Mooney viscosity (MST (5+4@200° C.)) of at least 120.

Embodiment M

The method of embodiments A-L; where the first fraction is characterized by a Mooney viscosity (MST (5+4@200° C.)) of at least 175.

Embodiment N

The method of embodiments A-M; where the second fraction is characterized by a Mooney viscosity (ML (1+4@125° C.)) of less than 120.

Embodiment O

The method of embodiments A-N; where the second fraction is characterized by a Mooney viscosity (ML (1+4@125° C.)) of less than 75.

Embodiment P

The method of embodiments A-O; where the second fraction is characterized by a Mooney viscosity (ML (1+4@125° C.)) of greater than 11.

Embodiment Q

The method of embodiments A-P; where the second fraction is characterized by a Mooney viscosity (ML (1+4@125° C.)) of greater than 14.

Embodiment R

The method of embodiments A-Q; where the olefinic copolymer rubber is a terpolymer of ethylene, propylene, and 5-ethylidene-2-norbornene, and where the thermoplastic resin is a propylene-based thermoplastic.

Embodiment S

The method of embodiments A-R; where the process is continuous.

Embodiment T

A process for preparing a thermoplastic vulcanizate, the process comprising: charging a reactor with an olefinic copolymer rubber, where the olefinic copolymer rubber is synthesized by employing a single-site catalyst and is characterized by a multimodal molecular weight distribution; charging the reactor, contemporaneously or sequentially with respect to the rubber, with a thermoplastic resin, an oil, and a cure system; melt mixing the rubber, the thermoplastic resin, the oil, and the cure system; and dynamically vulcanizing the rubber.

Embodiment U

A thermoplastic vulcanizate comprising: a cured rubber and a continuous thermoplastic phase, where the cured rubber is the dynamic vulcanization product of a multimodal olefinic copolymer characterized by a multimodal molecular weight distribution, and an average branching index of greater than 0.8.

In order to demonstrate the practice of the present invention, the following examples have been prepared and tested. The examples should not, however, be viewed as limiting the scope of the invention. The claims will serve to define the invention.

EXAMPLES

The elastomeric copolymers identified in Table I were employed in the preparation of thermoplastic vulcanizate compositions.

TABLE I

| Rubber | 1st Fraction | | 2nd Fraction | | Blend | | Oil | | Diene | Ethylene |
| | MST | % | ML | % | ML | MST | PHR | BI | % | % |
| --- | --- | --- | --- | --- | --- | --- | --- | --- | --- | --- |
| ZN-EPDM I | 46 | 50 | 11 | 50 | 42 | 9 | 0 | 0.59 | 4.4 | 63 |
| ZN-EPDM II | 61 | 50 | 17 | 50 | 73 | 15 | 0 | 0.68 | 4.9 | 66.2 |

TABLE I-continued

| Rubber | 1st Fraction MST | 1st Fraction % | 2nd Fraction ML | 2nd Fraction % | Blend ML | Blend MST | Oil PHR | BI | Diene % | Ethylene % |
|---|---|---|---|---|---|---|---|---|---|---|
| ZN-EPDM III | 52 | 50 | 63 | 50 | 126 | 26 | 35 | 0.78 | 4.8 | 64 |
| COM- EPDM I | 50 | N/A | N/A | N/A | 242 | 50 | 75 | 0.5 | 3.9 | 64 |
| COM- EPDM II | 14 | 11 | 150 | 89 | 90 | 19 | 0 | 0.6 | — | — |
| M- EPDM I | 46 | 50 | 11 | 50 | 51 | — | 0 | 1.0 | — | — |
| M- EPDM II | 48 | 50 | 10 | 50 | 52 | — | 0 | 1.0 | — | — |
| M- EPDM III | 60 | 50 | 8 | 50 | 54 | — | 0 | 1.0 | — | — |
| M- EPDM IV | 53 | 50 | 9 | 50 | 55 | — | 0 | 1.0 | — | — |
| M- EPDM V | 53 | 49 | 14 | 51 | 58 | 12 | 0 | 1.0 | 4.4 | 64.2 |
| M- EPDM VI | 59 | 49 | 21 | 51 | 70 | 14 | 0 | 1.0 | 4.4 | 64.6 |

Those elastomeric copolymers labeled with the prefix "Com" were obtained commercially. Namely, COM-EPDM I was obtained under the tradename V3666™ (ExxonMobil Corp.) and was poly(ethylene-co-propylene-co-5-ethylidene-2-norbornene) characterized by having a diene content of about 3.9 weight percent, a Mooney viscosity $ML_{(1+4)}$@125° C. of about 52 (oil extended at 75 phr), an intrinsic viscosity (dl/g) in decalin at 135° C. of about 4 dl/g, a weight average molecular weight of about 850 kg/mole, a number average molecular weight of about 170 kg/mole, an ethylene content of about 64 weight percent, a paraffinic oil content of 75 phr (the parts by weight in Table I referring to the amount of rubber and paraffinic oil). COM-EPDM II was obtained under the tradename V7500™ (ExxonMobil Corp.) and was characterized as a bimodal Ziegler Natta synthesized EPDM polymer composition without extender oil.

Those elastomeric copolymers labeled with the prefix "ZN" were prepared in accordance with the procedures described in U.S. Patent Application Publication Nos. 2008/0033107 and 2008/0033089. Specifically, polymerizations were carried out in a series of two reactors with continuous flow of feeds to the system and continuous withdrawal of products. Ethylene, propylene and ENB feeds were combined into one stream with hexane. The catalyst $VOCl_3$ and sesqui co-catalyst ethyl aluminum sesquichloride were fed separately to the reactor. The product from the reactor was deashed through a set of deashing vessels in which the hydrocarbon stream was contacted in countercurrent flow with water. The water was removed by settling and the deashed hydrocarbon phase was blended by on-line metering of the extender oil, if used, and fed into a flash drum in which a flowing stream of steam in hot water precipitated the polymer by removing the solvent into the vapor phase. The polymer crumb that resulted was dried in several steps through extrusion drying and the dry rubber was baled into the final product.

Those elastomeric copolymers labeled with the prefix "M" were prepared in accordance with the procedures described herein and in U.S. Patent Application Publication No. 2003/0162926. Specifically, polymerizations were carried out in a series of two reactors with continuous flow of feeds to the system and continuous withdrawal of products. Ethylene, propylene and ENB feeds were combined into one stream with hexane along with a hexane solution of triisobutyl aluminum scavenger to reduce the level of catalyst poisons. The catalyst (bis(methyl)(cyclopentadienyl)(di(4-triethylsilyl-phenyl-)(methyl)-9-(2,7-di-tert-butyl-fluorenyl-)hafnium) and activator (N,N-Dimethyl anilinium(tetrakis pentafluorophenyl borate) were pre-mixed in toluene and pumped, separately from the monomer feed, to the reactor. In some of the examples an alternate catalyst—Diphenylmethylene (cyclopentadienyl(fluorenyl)hafnium dimethyl was used. The product from the reactor exited through a pressure control valve and was collected for polymer recovery. The polymer product was recovered from solution at the completion of the polymerization by either steam stripping followed by mill drying or by devolatilizing extrusion and underwater pelletization.

As is evident from the characteristics in Table I, all of the elastomeric copolymers except for COM-EPDM I included a bimodal blend of polymers. The ML and MST were determined as described herein. Likewise, the branching index (BI) was determined as described herein.

Samples 1-11

Thermoplastic vulcanizates were prepared by dynamically vulcanizing a rubber within a twin-screw extruder using continuous processing techniques known in the art. The rubber of the inventive compositions, which are labeled "I" in Table II (as compared to the comparative samples labeled "C"), were advantageously fed to the extruder in a non-oil extended granular form. These granules were characterized by a weight-average diameter of less than 8 mm, and existed as part of the manufacturing process for synthesizing the polymer. In other words, no mechanical chopping or grinding of the rubber was required prior to charging to the reactor. The comparative rubber prepared by Ziegler-Natta polymerization techniques (i.e. those labeled with the prefix "ZN") and the commercially obtained rubber required grinding prior to inclusion into the reactor.

A phenolic resin cure system was employed to effect vulcanization while the rubber underwent dynamic mixing with a thermoplastic resin. Oil was added to the extruder both before and after cure as set forth in Table II, which also identifies the type of rubber employed in the Samples. Otherwise, the ingredients included 42 parts by weight clay, 2 parts by weight zinc oxide, 58 parts by weight thermoplastic resin, 5 parts by weight phenolic resin, and 1.26 parts by weight anhydrous tin chloride, with each amount being based on 100 parts by weight of the rubber. Commercial EPDM I was oil extended with 75 parts by weight oil per 100 parts by weight rubber, and ZN-EPDM III was oil extended with 35 parts by weight oil per 100 parts by weight rubber.

The phenolic resin was a resole-type resin, including a blend of octylphenol and nonylphenol formaldehyde dispersed in paraffinic oil. The thermoplastic resin was polypropylene having an MFR of 0.8 and was obtained under the tradename PP534-1 (ExxonMobil) and/or F008F (Sunoco). The extender oil was a paraffinic oil obtained under the tradename Sunpar™ 150M (Sunoco). The filler was a clay filler obtained under the tradename Icecap K™ (Burgess).

TABLE II

| Samples | 1 | 2 | 3 | 4 | 5 | 6 | 7 | 8 | 9 | 10 | 11 |
|---|---|---|---|---|---|---|---|---|---|---|---|
| Inventive/Comparative | C | C | C | I | I | I | I | I | I | C | C |
| ZN-EPDM I | — | 100 | — | — | — | — | — | — | — | — | — |
| ZN-EPDM II | — | — | 100 | — | — | — | — | — | — | — | — |
| ZN-EPDM III | — | — | — | — | — | — | — | — | — | — | 135 |
| COM- EPDM I | 175 | — | — | — | — | — | — | — | — | — | — |
| COM- EPDM II | — | — | — | — | — | — | — | — | — | 100 | — |
| M- EPDM I | — | — | — | 100 | — | — | — | — | — | — | — |
| M- EPDM II | — | — | — | — | 100 | — | — | — | — | — | — |
| M- EPDM III | — | — | — | — | — | 100 | — | — | — | — | — |
| M- EPDM IV | — | — | — | — | — | — | 100 | — | — | — | — |
| M- EPDM V | — | — | — | — | — | — | — | 100 | — | — | — |
| M- EPDM VI | — | — | — | — | — | — | — | — | 100 | — | — |
| Precure Oil | 25 | 100 | 100 | 100 | 100 | 100 | 100 | 100 | 100 | 100 | 65 |
| Post Cure Oil | 30 | 30 | 30 | 30 | 30 | 30 | 30 | 30 | 30 | 30 | 30 |
| Hardness (Shore A) | 69 | 64 | 67 | 66 | 63 | 64 | 64 | 66 | 66 | 69 | 69 |
| Ultimate Tensile Strength (MPa) | 6.7 | 4.3 | 5.3 | 4.6 | 4.2 | 4.1 | 4.5 | 6.1 | 5.4 | 6.4 | 7.5 |
| Elongation at Break (%) | 302 | 200 | 189 | 190 | 164 | 165 | 197 | 229 | 222 | 231 | 292 |
| M100 (MPa) | 3.5 | 3.0 | 3.6 | 3.2 | 3.1 | 3.1 | 3.1 | 3.6 | 3.5 | 4.0 | 3.5 |
| Tension Set (%) | 8 | 10 | 9 | 8 | 8 | 8 | 8 | 8 | 9 | 8 | 8 |
| Compression Set (%) | 31 | 37 | 29 | 32 | 31 | 32 | 32 | 30 | 31 | 29 | 24 |
| LCR Viscostiy (Pa s) | 88 | — | 112 | 103 | 107 | 104 | 101 | 109 | 106 | 111 | 103 |
| Weight Gain (%) | 80 | 105 | 77 | 89 | 88 | 90 | 90 | 82 | 81 | 77 | 71 |

The data provided in the tables representing the engineering properties of the individual thermoplastic vulcanizates is an average (except for sample 2) of at least three individual tests that were performed on each composition. Hardness was determined according to ISO 868 with a five-second time interval. 100% modulus, ultimate tensile strength, and elongation at break (ultimate elongation), were determined according to ISO 37 at 23° C. (unless otherwise specified) at 50 mm per minute by using an Instron testing machine. Weight gain was determined according to ASTM D-471 at 121° C. after 24 hours. LCR viscosity was determined according to ISO 11443 at 204° C. Tension set was determined according to ASTM D 412. Compression Set was determined according to ASTM D 395D at 25% compression for 24 hours at 70° C.

The data in Table II demonstrates that thermoplastic vulcanizates prepared in accordance with the present invention demonstrate an advantageous overall balance of properties. Unexpectedly, the ultimate elongation of the compositions prove to be relatively high compared to the other compositions. The data also suggests that the molecular weight of the low-molecular weight fraction (i.e. the fraction having a lower Mooney viscosity) plays a role in obtaining thermoplastic vulcanizates with a good overall balance of properties.

Samples 12-29

Second series of thermoplastic vulcanizates were prepared by employing ingredients and procedures similar to those employed in the preparation of samples 1-11. Again, each thermoplastic vulcanizate was prepared with 42 parts by weight clay, 2 parts by weight zinc oxide, 58 parts by weight thermoplastic resin, 5 parts by weight phenolic resin, and 1.26 parts by weight anhydrous tin chloride, per 100 parts by weight rubber. Oil was added to the extruder both before and after cure as provided in Table III, which also sets forth the specific rubber employed in each sample.

TABLE III

| Samples | 12 | 13 | 14 | 15 | 16 | 17 | 18 | 19 | 20 |
|---|---|---|---|---|---|---|---|---|---|
| Inventive/Comparative | C | C | C | C | I | I | I | I | I |
| ZN-EPDM I | — | — | — | — | — | — | — | — | — |
| ZN-EPDM II | — | — | 100 | 100 | — | — | — | — | — |
| ZN-EPDM III | — | — | — | — | — | — | — | — | — |
| COM- EPDM I | 175 | 175 | — | — | — | — | — | — | — |
| COM- EPDM II | — | — | — | — | — | — | — | — | — |
| M- EPDM I | — | — | — | — | 100 | 100 | — | — | — |
| M- EPDM II | — | — | — | — | — | — | 100 | 100 | — |
| M- EPDM III | — | — | — | — | — | — | — | — | 100 |
| M- EPDM IV | — | — | — | — | — | — | — | — | — |
| M- EPDM V | — | — | — | — | — | — | — | — | — |
| M- EPDM VI | — | — | — | — | — | — | — | — | — |
| Precure Oil | 25 | 10 | 100 | 85 | 100 | 85 | 100 | 85 | 100 |
| Post Cure Oil | 30 | 30 | 30 | 30 | 30 | 30 | 30 | 30 | 30 |
| Hardness (Shore A) | 69 | 73 | 67 | 70 | 66 | 67 | 63 | 67 | 64 |
| Ultimate Tensile Strength (MPa) | 6.2 | 6.3 | 5.3 | 6.1 | 4.6 | 5.1 | 4.2 | 5.0 | 4.1 |
| Elongation at Break (%) | 302 | 264 | 189 | 196 | 190 | 155 | 164 | 181 | 165 |
| M100 (MPa) | 3.5 | 3.9 | 3.6 | 4.1 | 3.2 | 4.0 | 3.1 | 3.6 | 3.1 |
| Tension Set (%) | 9 | 10 | 9 | 9 | 8 | 9 | 8 | 10 | 8 |
| Compression Set (%) | 31 | 33 | 29 | 30 | 32 | 31 | 31 | 31 | 32 |
| LCR Viscosity (Pa s) | 88 | 96 | 65 | 61 | 72 | 105 | 107 | 103 | 104 |
| Weight Gain (%) | 78 | 78 | 77 | 77 | 89 | 87 | 88 | 90 | 90 |

TABLE III-continued

| Samples | 21 | 22 | 23 | 24 | 25 | 26 | 27 | 28 | 29 |
|---|---|---|---|---|---|---|---|---|---|
| Inventive/Comparative | I | I | I | I | I | I | I | C | C |
| ZN-EPDM I | — | — | — | — | — | — | — | — | — |
| ZN-EPDM II | — | — | — | — | — | — | — | — | — |
| ZN-EPDM III | — | — | — | — | — | — | — | — | — |
| COM- EPDM I | — | — | — | — | — | — | — | — | — |
| COM- EPDM II | — | — | — | — | — | — | — | 100 | 100 |
| M- EPDM I | — | — | — | — | — | — | — | — | — |
| M- EPDM II | — | — | — | — | — | — | — | — | — |
| M- EPDM III | 100 | — | — | — | — | — | — | — | — |
| M- EPDM IV | — | 100 | 100 | — | — | — | — | — | — |
| M- EPDM V | — | — | — | 100 | 100 | — | — | — | — |
| M- EPDM VI | — | — | — | — | — | 100 | 100 | — | — |
| Precure Oil | 85 | 100 | 85 | 100 | 85 | 100 | 85 | 100 | 85 |
| Post Cure Oil | 30 | 30 | 30 | 30 | 30 | 30 | 30 | 30 | 30 |
| Hardness (Shore A) | 67 | 64 | 67 | 66 | 69 | 66 | 70 | 69 | 69 |
| Ultimate Tensile Strength (MPa) | 5.1 | 4.5 | 5.0 | 6.1 | 6.5 | 5.4 | 5.5 | 6.4 | 6.8 |
| Elongation at Break (%) | 164 | 197 | 177 | 229 | 216 | 222 | 183 | 231 | 246 |
| M100 (MPa) | 3.8 | 3.1 | 3.6 | 3.6 | 4.2 | 3.5 | 4.0 | 4.0 | 4.0 |
| Tension Set (%) | 8 | 8 | 8 | 8 | 8 | 9 | 9 | 8 | 8 |
| Compression Set (%) | 32 | 32 | 32 | 30 | 31 | 31 | 28 | 29 | 26 |
| LCR Viscosity (Pa s) | 118 | 88 | 104 | 96 | 83 | 65 | 111 | 74 | 106 |
| Weight Gain (%) | 90 | 90 | 88 | 82 | 83 | 81 | 84 | 77 | 80 |

The data in Table III confirms the observations made with the thermoplastic vulcanizates of the previous samples. In particular, the overall balance of properties was advantageous for the inventive compositions particularly where the low-molecular weight fraction included higher molecular weight polymers as evidenced by higher Mooney viscosity. Ultimate elongation was likewise unexpectedly high. Also, the data in Table III confirms the trend shown in Table II that thermoplastic vulcanizates made with M-EPDM I-IV, which have relatively low molecular weight fractions, did not perform as well. This suggests some criticality with respect to the low molecular weight fraction, which was unexpected.

Various modifications and alterations that do not depart from the scope and spirit of this invention will become apparent to those skilled in the art. This invention is not to be duly limited to the illustrative embodiments set forth herein.

What is claimed is:

1. A method for preparing a thermoplastic vulcanizate, the method comprising:
(i) charging a reactor with an olefinic copolymer rubber, where the olefinic copolymer rubber is metallocene catalyzed and is characterized by a bimodal molecular weight distribution that includes a first fraction and a second fraction,
where the rubber has an average branching index of greater than 0.95,
where the rubber includes less than 5 parts by weight oil per 100 parts by weight rubber,
where the rubber includes less than 1 parts by weight non-rubber particulate per 100 parts by weight rubber,
where the rubber comprises 49 wt % of the first fraction;
where the first fraction is characterized by a Mooney viscosity that is greater than the Mooney viscosity of the second fraction,
where the second fraction is characterized by a Mooney viscosity (ML (1+4)@125° C.) greater than 15 and less than 50,
where the rubber comprises less than 65 wt % ethylene-derived units and less than 5 wt % diene derived units, and
where the rubber is in the form of granules having a particle size less than 8 mm;
(ii) charging the reactor, contemporaneously or sequentially with respect to the rubber, with a thermoplastic resin, an oil, and a cure system;
(iii) melt mixing the rubber, the thermoplastic resin, the oil, and the cure system; and
(iv) dynamically vulcanizing the rubber to form a thermoplastic vulcanizate, wherein the rubber within the thermoplastic vulcanizate forms dispersed particles of vulcanized rubber within a continuous phase or matrix of the thermoplastic resin.

2. The method of claim 1, where said step of charging the reactor, contemporaneously or sequentially with respect to the rubber, with a thermoplastic resin, an oil, and a cure system also includes charging the reactor with filler.

3. The method of claim 1, where the olefinic copolymer rubber includes less than 1 part by weight oil per 100 parts by weight rubber.

4. The method of claim 3, where the olefinic copolymer rubber is devoid of oil.

5. The method of claim 1, where the olefinic copolymer rubber includes less than 0.1 part by weight non-rubber particulate per 100 parts by weight rubber.

6. The method of claim 1, where the olefinic copolymer rubber includes less than 0.01 part by weight non-rubber particulate per 100 parts by weight rubber.

7. The method of claim 1, where the olefinic copolymer rubber is in the form of granules having a particle size of less than 6 mm.

8. The method of claim 1, where the olefinic copolymer rubber is a terpolymer of ethylene, propylene, and 5-ethylidene-2-norbornene, and where the thermoplastic resin is a propylene-based thermoplastic.

9. The method of claim 1, where the process is continuous.

10. A process for preparing a thermoplastic vulcanizate, the process comprising:
(i) charging a reactor with an olefinic copolymer rubber, where the olefinic copolymer rubber is synthesized by employing a metallocene catalyst and is characterized by a bimodal molecular weight distribution that includes a first fraction and a second fraction,
where the rubber has an average branching index of greater than 0.95;

where the first fraction is characterized by a Mooney viscosity that is greater than the Mooney viscosity of the second fraction, where the second fraction is characterized by a Mooney viscosity (ML (1+4)@125° C.) greater than 15 and less than 50, where the rubber comprises 49 wt % of the first fraction, where the rubber comprises less than 65 wt % ethylene-derived units and less than 5 wt % diene derived units, and where the rubber includes less than 1 part by weight oil per 100 parts by weight rubber;

(ii) charging the reactor, contemporaneously or sequentially with respect to the rubber, with a thermoplastic resin, an oil, and a cure system;

(iii) melt mixing the rubber, the thermoplastic resin, the oil, and the cure system; and (iv) dynamically vulcanizing the rubber to form a thermoplastic vulcanizate, wherein the rubber within the thermoplastic vulcanizate forms dispersed particles of vulcanized rubber within a continuous phase or matrix of the thermoplastic resin.

\* \* \* \* \*